3,297,073
INTERMEDIATE ARTICLE

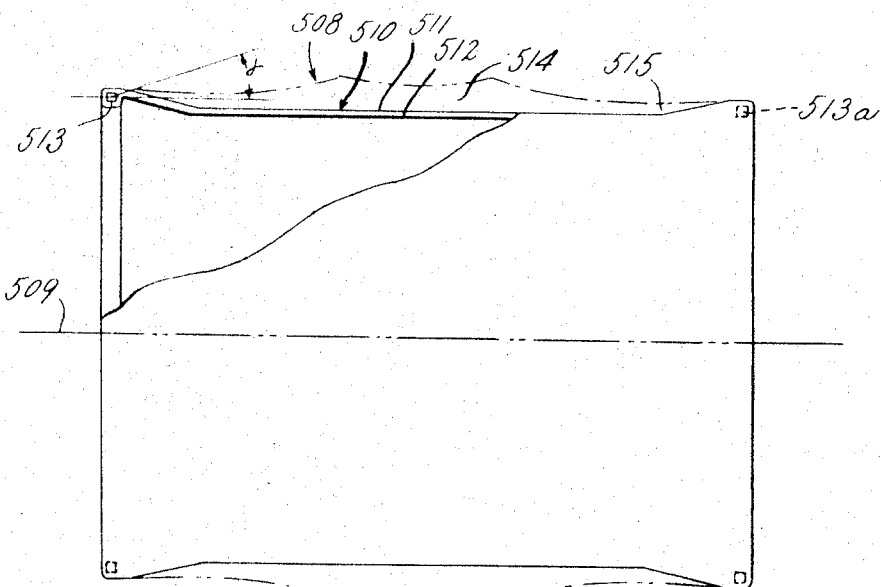
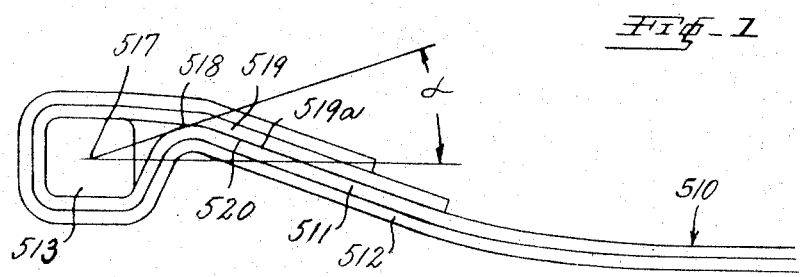
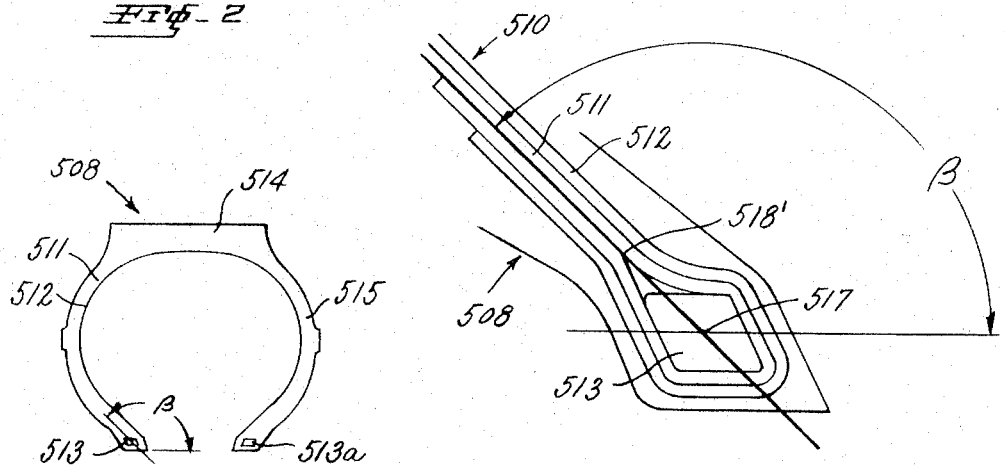

Sheppard A. Black, Wayne, and John D. Heide, Ramsey, N.J., assignors to United States Rubber Company, New York, N.Y., a corporation of New Jersey
Original application Dec. 4, 1962, Ser. No. 242,116. Divided and this application Feb. 18, 1966, Ser. No. 528,633
3 Claims. (Cl. 152—362)

This application is a division of our copending application Serial No. 242,116, filed December 4, 1962 and entitled "Automatic Machine and Method."

This relates to an improved construction of fabric carcasses for pneumatic vehicle tires. More specifically, it relates to the conformation of the cord fabric in the region adjacent to the beads at either end of the carcass cylinder, and to the relative diameters of the carcass cylinder and the beads.

Tire carcasses are generally built by forming two or more sheets of tire cord fabric into a generally cylindrical shape, affixing a bead to the exterior surface of each end region of this shape, and then turning up that portion of the fabric which extends beyond the bead and adhering this turned up fabric to a portion of the surface of the fabric disposed between the beads, thereby "locking" each of the beads into the fabric construction. The cord fabric employed for this construction is generally coated with a layer of uncured rubber which renders each surface of the material rather sticky. Therefore, the raw tire carcass tends to retain the shape into which it was formed unless major forces are exerted to overcome the tack between adjacent layers of the coated cord fabric. Subsequent to the building of the carcass the other components of the tire, such as for instance the tread and sidewall portions, are assembled to it. The raw tire is then changed from its generally cylindrical shape to the familiar toroidal tire shape by exerting a considerable radial force upon the inside of the structure. This is generally accomplished by exerting internal pressure on a curing bag which has been inserted into the raw tire within the confines of a curing press, wherein the shaped tire is also vulcanized. Examples of such tire curing presses are the "Bag-O-Matic" curing press and the McNeil Machine & Engineering Company, generally described in U.S. Patent 2,997,740 and the Autoform curing press of the National Rubber Machinery Company, generally described in U.S. Patent 2,858,566.

The raw tire carcass is generally formed on a building drum by wrapping the respective sheets of cord fabric on the surface of the drum, carefully maintaining the desired angle between cords of adjacent layers of cord fabric. It is common to use for this purpose a "collapsible" building drum of the type shown on page 415, The Vanderbilt Rubber Handbook, Winspear (Ed.) (1958). Such a drum is generally "oversized"; that is, when assembled it has an external diameter greater than the internal diameter of the beads to be used in the tires to be built upon it. The fabric is generally wrapped on these drums in such a fashion that a portion of each sheet overhangs the respective axial extremities of the drum by a predetermined amount. This overhanging fabric is then smoothly turned radially inwards over the shoulders located on the respective axial extremities of the drum surface. A bead is then placed concentrically against each of these turned down fabric surfaces, and the respective free ends of fabric are then "turned up" smoothly to envelop each bead. When a building operation upon such a drum is complete, the drum is collapsed, i.e., made to assume a diameter smaller than the beads, to permit the raw tire to then be slipped off axially. If one considers the cross-section of such a carcass on a plane through its axis, it will be apparent that the fabric in the region of the respective beads will form an angle α as defined below with the axis of the carcass which is a function of the internal diameter of the beads relative to the expanded diameter of the collapsible building drum and of the curvature of the drum shoulders. Thus, for example, tire carcasses with a nominal 14-inch diameter are commonly built upon drums with a 15¼-inch external expanded diameter. A normal two-ply carcass built on such a drum would have a fabric angle as designated above of approximately 53°.

The magnitude of angle α is relatively important in the subsequent manufacture of the tire. When the shape of the raw tire is changed from the generally cylindrical form to the toroidal tire form, the fabric plies must rotate about the respective beads from their orientation in the raw cylindrical tire to a position in which the fabric is almost perpendicular to the tire axis in the region of each bead. The tacky nature of these fabric plies, resulting from the coating of uncured rubber on each ply, tends to inhibit this rotation of the fabric about the bead. Where the rotation is excessive, weaknesses may be introduced into the individual tire cords due to the excessive local stresses imparted to them, or nonuniformities may be introduced into the tire structure as a whole by virtue of nonuniform rotation of the various components. It is therefore desirable to keep the required rotation to a minimum. Inasmuch as the final orientation of the fabric (more or less normal to the tire axis in the region of the beads) is dictated by the required shape of the finished article, the required rotation can be reduced only by affecting the design of the raw tire. Thus the greater the angle between the fabric in the region of each bead and the axis of the raw tire, the less rotation will be required during the forming of the tire.

It is highly desirable to form raw tires on "undersized" building drums, that is, on drums which have an external diameter not greater than the internal diameter of the carcass in the bead region. The advantages of the use of such drums are multiple. They obviate the need for a collapsing mechanism for the drum. Tires can be removed from them by simply breaking the tacky bond between the inside surface of the cord fabric and the exterior of the drum, as by blowing air between the surfaces, and then pulling the carcass off the drum axially. Defects in quality of tires stemming from the introduction of wrinkles where the fabric is not turned radially inwards over the shoulder of the oversized drum with perfect smoothness are also avoided by the use of undersized drums, since the entire step of turning the fabric inwards is obviated. The use of such drums is also desirable in tire carcass manufacturing processes wherein the beads are set in place and the fabric end regions are turned up automatically, as for instance on the bead setter described in our above-mentioned copending application.

However, the angle between the fabric in the bead region and the axis of a raw tire made on undersized drums would ordinarily be such as to require far greater rotation about the bead during shaping than is the case with tires built on "oversized" drums.

It is an object of this invention to provide a substantially uncured tire carcass having throughout its tubular central portion an internal fabric diameter no greater than the internal diameter at the beads, but wherein the fabric in the bead region forms an angle with the axis of the tire carcass that will require a minimum rotation about the bead when the tire is formed into toroidal shape.

It is another object of this invention to provide a raw tire in cylindrical form wherein the internal fabric diameter is no greater than the internal diameter at the beads, but wherein the fabric in the bead region forms an angle with the axis of the tire that will require a minimum rotation about the bead when the tire is formed into toroidal shape.

FIG. 1 is a view of a raw two-ply tire carcass of this invention, partially broken away and partially sectioned on a plane containing the axis of the tire carcass. The outline of the tread and sidewall stock is shown in "phantom" lines to indicate the appearance of a raw tire of the invention.

FIG. 2 is an enlarged sectional view of the bead region of the raw carcass shown in the upper left-hand portion of FIG. 1, showing in detail the location and assembly of each fabric ply and ply end in the bead region.

FIG. 3 is the upper half of a cross-sectional view of a shaped tire. The cross-section is taken on a plane containing the axis of the tire.

FIG. 4 is an enlarged view of the left-hand bead region of the shaped tire shown in FIG. 3. The figure corresponds to FIG. 2, showing in detail the new location of each fabric ply and ply end in the bead region after the rotation that accompanies shaping.

The generally cylindrical tire carcass 510 shown in FIGS. 1 and 2 consists of two 511 and 512 layers of tire cord fabric formed into a two-ply fabric tube. Although two plies are shown in FIG. 1, it is within the meaning and scope of this invention to form the carcass of any number of plies of cord fabric, as for instance one, four or six plies. Each ply of fabric is coated on both of its surfaces with a layer of uncured rubber which renders the surface tacky and prevents slip between adjacent surfaces during tire construction. The beads 513 and 513a are shown in FIG. 1 to be substantially rectangular in cross-section. It is, however, within the scope of this invention to employ beads of other than rectangular cross-section, as, for instance, beads of circular cross-section. As can be seen from FIG. 1 the bead 513 is held in position in the end region of the carcass 510 and subsequently in the end region of the tire 508 by virtue of a turn-up made in the ends of the fabric tube. This turned up fabric adjacent said ends is adhered to that portion of the carcass fabric surface with which it is contacted by virtue of the tackiness of the rubber coated surface.

The tread stock 514 and sidewall stock 515 of the raw cylindrical tire 508 are shown with the aid of "phantom" lines in FIG. 1.

In FIG. 2 the details in construction in the bead region of the tire carcass 510 can be seen in greater detail. Whenever reference is made in this specification and claims to the angle of the fabric in the bead region with reference to the axis 509 of the raw carcass 510 or tire 508, the angle $\alpha$ shown in FIG. 1 is intended. The angle $\alpha$ is defined as the angle between (a) a line through the centroid 517 of the bead 513 parallel to the axis 509 of the tire 508 or carcass 510 and (b) a line in any plane containing the axis 509 of the tire 508 or carcass 510 which connects the centroid 517 of the bead 513 with the point of first substantial contact 518 between the turned up end 519 of fabric and the fabric ply 511 to which it is joined. The centroid 517 of the bead is defined as the point which would be the center of gravity of the cross-section of the bead 513 if all of the elements of the bead 513 were of equal density. The point of first contact 518 is defined as the point closest to the bead 513 at which, in the defined plane containing the axis 509, the tangent to the surface 519a of the turned up fabric end 519 is parallel to the tangent to the underlying surface 520 of the ply 511 to which the turned up fabric end 519 is joined.

FIG. 3 shows the cross-section that the raw tire 508 assumes when it has been shaped into toroidal form, a process that generally occurs in the curing press. A more detailed examination of the fabric in the bead region of such a formed tire 508, made possible by the enlarged representation of this area in FIG. 4, indicates that the fabric is now more nearly vertically disposed with respect to the tire axis 509. The shaping process rotates the fabric about the respective beads 513 and 513a and shifts the location of the point of first substantial contact from 518 to 518′ as shown in FIG. 4 so that the line 517–518′ now forms the angle $\beta$ with a line parallel to the tire axis 509 through the centroid 517. It will be appreciated that during the forming step the fabric in the bead region of the bead 513 was rotated about the bead 513 by an angle equal to $\beta$ minus $\alpha$. Therefore, the greater the magnitude of angle $\alpha$ in the raw tire 508 or raw tire carcass 510, the less rotation of the fabric about the bead 513 will be necessary during the forming step. Such rotation is conducive to the forming of fabric wrinkles or the uneven distribution of fabric, weakening of individual cords within the fabric, and the separation of the cord fabric from its coating of uncured rubber due to the fact that the sliding of the ply surfaces 519a and 520 one upon the other is inhibited by the presence of the tacky uncured rubber between adjacent surfaces.

The raw tire carcasses 510 and raw tires 508 of this invention may be prepared by the method and apparatus described with reference to the bead setter of our above-mentioned copending application Serial No. 242,116. It is essential for the construction of such a carcass 510 and resultant tire 508 that the building drum upon which the plies 511 and 512 are wound have an exterior diameter less than the interior diameter of the carcass 510 and tire 508 in the bead region.

The desired value of angle $\alpha$ may be imparted to the cord fabric during the building process by shaping means disposed within the confines of the fabric cylinder. These shaping means may be radially retractable to facilitate the subsequent axial removal of the finished raw carcass 510 or tire 508 from the drum. The required action of these means is that they "raise," that is increase the diameter of, a narrow zone of the fabric adjacent to each bead and lying between that bead and the other. These means can be the same means as those which perform the function of restraining the axial convergence of the beads during the turning up of the fabric ends to envelop the beads.

The said means may be the internal bead holding fingers disclosed in our above-mentioned copending application in the section thereof relating to the bead setter.

It is within the scope of this invention to actuate these means and thereby impart the desired value of the angle $\alpha$ to the fabric either before or after the tread and/or sidewall portions are added to the carcass plies in the building of the tire, thereby to make either the raw carcass 510 or the raw tire 508 of this invention.

In principle, the objects of this invention would best be served when the angle $\alpha$ in a carcass 510 or raw tire 508 is as large as possible because, as already observed, the greater the magnitude of angle $\alpha$, the less rotation of fabric about the bead 513 will occur in the tire shaping process.

But there are practical limitations to the magnitude of angle $\alpha$, beyond which it is not feasible to form the tire carcass 510 and raw tire 508 of this invention. Firstly, if the shape of the fabric in the bead region is to be created by radially retractable shaping means disposed within the confines of the fabric cylinder, the magnitude of angle $\alpha$ will be a function of the relative expanded and retracted diameters of these means. A practical problem in designing these means arises if this ratio is required to be very high.

Secondly, if the narrow zone of fabric adjacent to each bead is "raised," that is increased in diameter, very greatly (to create an angle $\alpha$ of great magnitude) the gross distortion in the carcass 510 or raw tire 508 which would be required to accommodate this change could be as detrimental to the product as those which this invention is designed to prevent.

We have found that when the angle $\alpha$ is greater than approximately 70° these practical disadvantages outweigh the benefits of the invention. The distention to which the fabric must be subjected if it is to be "raised" to create an angle α of more than 70° can be as detrimental as excessive rotation of fabric about the beads during the tire shaping step. Also, such excessive "raising" may cause slippage of the turned up fabric which would result in a tire wherein the amount of fabric turned up over the bead was not constant around the circumference of the bead.

On the other hand, where angle α is less than 0° the advantages to be gained in terms of reduced fabric rotation about the bead during the shaping of carcasses or raw tires of this invention decrease to the point where they become unobservably small. Also, if the means for creating the angle α serve simultaneously to restrain the convergence of the beads 513 and 513a during fabric turn-up, the radial protrusion of these means to such an extent as to produce an angle α of at least 0° is necessary to restrain the said convergence.

With the apparatus of the bead setter described in our above-mentioned copending application, two-ply tire carcasses with an angle α of approximately 19° are formed. These carcasses perform very satisfactorily during subsequent shaping into tires and produce a finished tire of highly acceptable quality. Another example of a tire carcass of this invention which performs very satisfactorily during subsequent processing and in ultimate service as a tire is a two-ply 14-inch tire with an angle α of 53°.

While there have been described what are at present considered to be preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. As an intermediate article of manufacture, a substantially uncured tire carcass comprising: a tube of fabric, a bead disposed at each end region of said fabric tube and surrounded by the end region of said fabric; said carcass having a cylindrically tubular central portion the internal diameter of which is no greater than the internal diameter of said carcass in the region of said beads; said fabric in the bead region of said carcass forming an angle with the axis of said carcass greater than 0° but less than approximately 70°.

2. As an intermediate article of manufacture, a substantially uncured tire carcass comprising: a tube of fabric; a bead disposed at each end region of said fabric tube and surrounded by the end region of said fabric; said carcass having a cylindrically tubular central portion the internal diameter of which is no greater than the internal diameter of said carcass in the region of said beads; said fabric in the bead region of said carcass forming an angle with the axis of said carcass of between approximately 19° and approximately 53°.

3. A substantially uncured tire in generally cylindrical form comprising: a tubular carcass of fabric; a bead disposed within each end region of said tire and surrounded by said fabric; rubber side-wall and tread portions disposed on said carcass; said carcass having a cylindrically tubular central portion the internal diameter of which is no greater than the internal diameter of said carcass in the region of said beads; said fabric in the bead region of said carcass forming an angle with the axis of said tire greater than 0° but less than approximately 70°.

No references cited.

ARTHUR L. LA POINT, *Primary Examiner.*

C. W. HAEFELE, *Assistant Examiner.*